United States Patent
Reiner et al.

(10) Patent No.: US 6,296,680 B1
(45) Date of Patent: Oct. 2, 2001

(54) BAG DUMP APPARATUS

(75) Inventors: Mary Reiner, Hughesville; Richard W. Ambs, Williamsport, both of PA (US)

(73) Assignee: The Young Industries, Inc., Muncy, PA (US)

( * ) Notice: Subject to any disclaimer, the term of this patent is extended or adjusted under 35 U.S.C. 154(b) by 0 days.

(21) Appl. No.: 08/377,473

(22) Filed: Jan. 24, 1995

(51) Int. Cl.⁷ ..................................... B01D 50/00
(52) U.S. Cl. ................... 55/322; 55/323; 55/327; 55/443; 55/472; 96/392
(58) Field of Search .................. 55/278, 302, 322, 55/323, 327, 334, 341.1, 341.7, 385.1, 442, 443, 465, 472, 486, 487; 96/392

(56) References Cited

U.S. PATENT DOCUMENTS

| | | | |
|---|---|---|---|
| 1,522,111 | * | 1/1925 | Franck-Philipson ............. 55/443 |
| 3,944,404 | * | 3/1976 | Andrasfalvy ..................... 55/302 |
| 4,277,260 | * | 7/1981 | Browning ......................... 55/302 |
| 4,655,804 | * | 4/1987 | Kercheval et al. ............... 55/334 |
| 4,889,452 | * | 12/1989 | Heyl ................................. 406/85 |
| 5,141,706 | * | 8/1992 | Clark ................................ 55/323 |
| 5,176,726 | * | 1/1993 | Beavis ............................. 55/472 |
| 5,230,723 | * | 7/1993 | Travis et al. ..................... 55/323 |
| 5,261,934 | * | 11/1993 | Shutic et al. ..................... 55/302 |
| 5,348,572 | * | 9/1994 | Jelich et al. ..................... 55/302 |
| 5,397,371 | * | 3/1995 | Hough ............................. 55/302 |

* cited by examiner

Primary Examiner—C. Scott Bushey
(74) Attorney, Agent, or Firm—Lalos & Keegan

(57) ABSTRACT

An apparatus into which particulate material contents of rupturable bags may be charged for further handling including a hopper having an inlet into which the material may be charged, producing portions of settling and airborne particles of the material, and an outlet through which the settling portion of the material may be discharged, a first filtering unit having an inlet communicating with the hopper inlet, a second filter unit having an inlet communicating with an outlet of the first filter unit and means for producing an air flow from the hopper inlet and sequentially through the first and second filter units whereby the portion of airborne particles of the material is drawn by the air stream through the filter units for removing the airborne particles therein.

9 Claims, 3 Drawing Sheets

US 6,296,680 B1

BAG DUMP APPARATUS

BACKGROUND OF THE INVENTION

1. Field of the Invention

This invention relates to bulk material handling and more particularly to an apparatus into which particulate or comminuted material contents of rupturable bags may be charged for further material handling, generally referred to in the relevant industry as filter bag dump stations.

2. Description of the Prior Art

In the prior art, there has been developed and in widespread use, a type of apparatus into which particulate material contents of rupturable bags may be charged for further handling such as pneumatic conveying, processing, storing and the like. Such type of apparatus generally includes a hopper having a grate disposed across an inlet opening thereof into which the contents of bagged material may be charged, a filtering unit having an inlet communicating with the interior of the hopper and a blower for drawing airborne particles produced by the charging of such material into the hopper from the vicinity of the work area and conveying them through the filter unit to prevent such particles from escaping into the ambient atmosphere and possibly causing environmental problems in a work area. An example of such an apparatus is illustrated and described in U.S. Pat. No. 4,889,452.

The type of filter unit provided in such an apparatus typically consists of a tube sheet forming a wall of an air plenum, a plurality of elongated, tubularly configured cages mounted on the tube sheet with the interiors thereof communicating with the air plenum through openings in the tube sheet, and filter media consisting of fabric or felt materials disposed on the tubular cages. A motor driven centrifugal blower typically is employed to create an air flow for capturing airborne particles at the charging inlet of the hopper, conveying such particles through the filtering media for removal and discharging the clean air into the ambient atmosphere. Although such particle filtration process has been highly effective in capturing and removing a substantial portion of the airborne particles produced in conventional bag dump stations of the type described, it has been found that such conventional stations are not always sufficiently effective in removing particulates of less than one micron size in compliance with more stringent federal and state dust control requirements.

SUMMARY OF THE INVENTION

Accordingly, it is the principal object of the present invention to provide an improved bag dump apparatus.

Another object of the present invention is to provide an improved bag dump apparatus capable of not only removing airborne particles produced when charging the contents of comminuted material into such apparatus but further recovering such material at the work site for further handling such as conveying, processing, storing and the like.

A further object of the present invention is to provide an improved bag dump apparatus which is capable of removing airborne particles of material being dumped into the apparatus of a smaller particle size than capable with conventional filter bag dump stations.

A still further object of the present invention is to provide an improved filter bag dump station into which bulk comminuted materials may be dumped for further handling which is capable of capturing and recovering particles of sub-micron size.

Another object of the present invention is to provide an improved filter bag dump station capable of capturing and recovering airborne particles created when bulk comminuted materials are charged therein which complies with more stringent governmental dust control regulations.

A further object of the present invention is to provide an improved filter bag dump station capable of capturing airborne particles having a sub-micron particle size which is simple in construction, comparatively inexpensive to manufacture, highly effective in performance and convenient to service and maintain.

Other objects and advantages of the present invention will become more apparent to those persons having ordinary skill in the art to which the present invention pertains from the following description taken in conjunction with the accompanying drawings wherein:

DESCRIPTION OF THE PREFERRED EMBODIMENT

Figure 2:
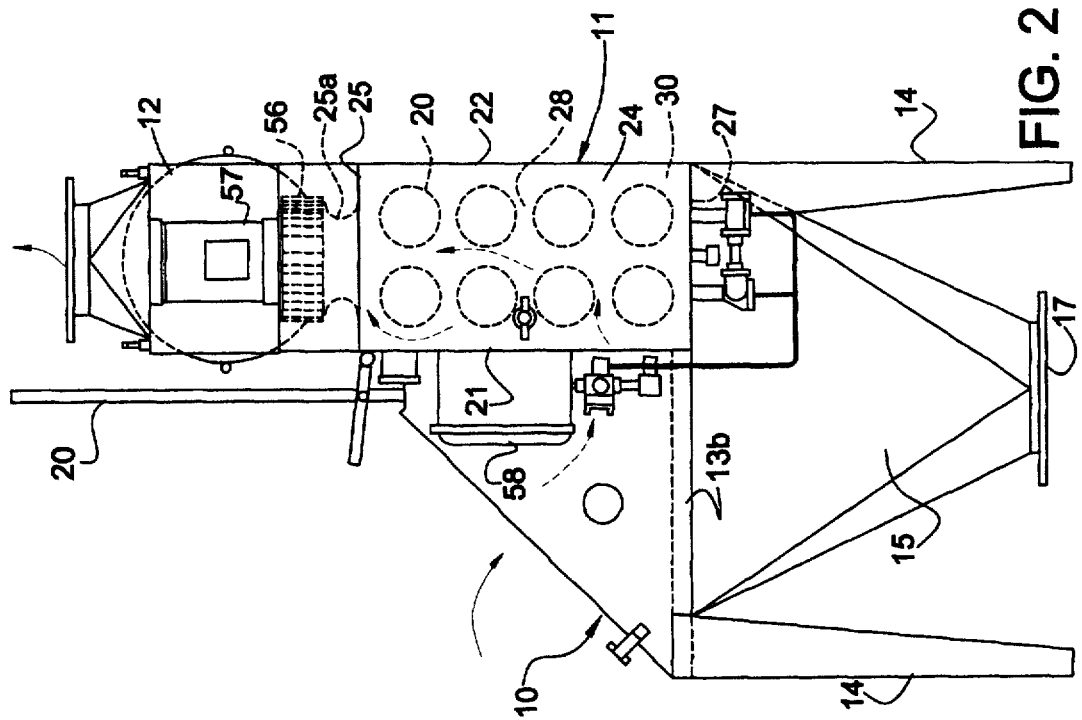
FIG. 2 is a side elevational view of the station shown in FIG. 1.
Figure 1:
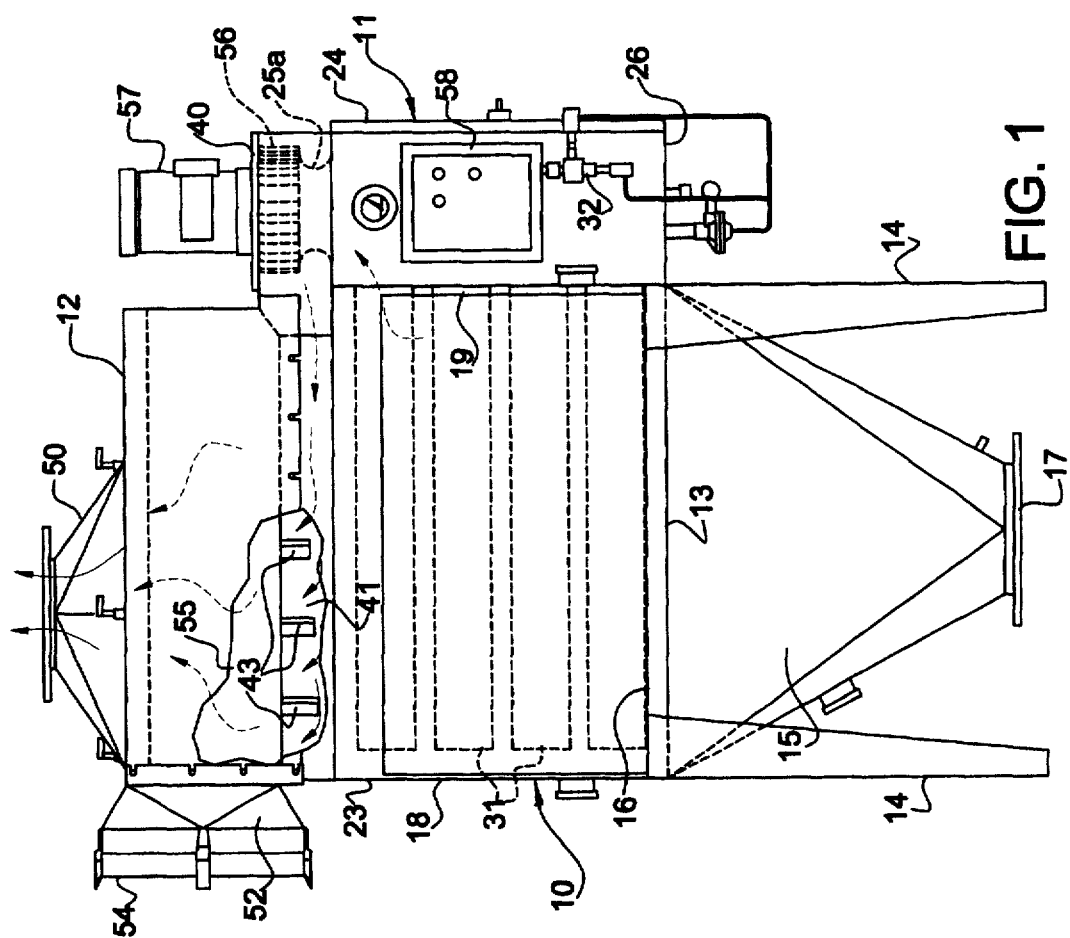
FIG. 1 is a front elevational view of a filter bag dump station embodying the present invention.
Figure 3:
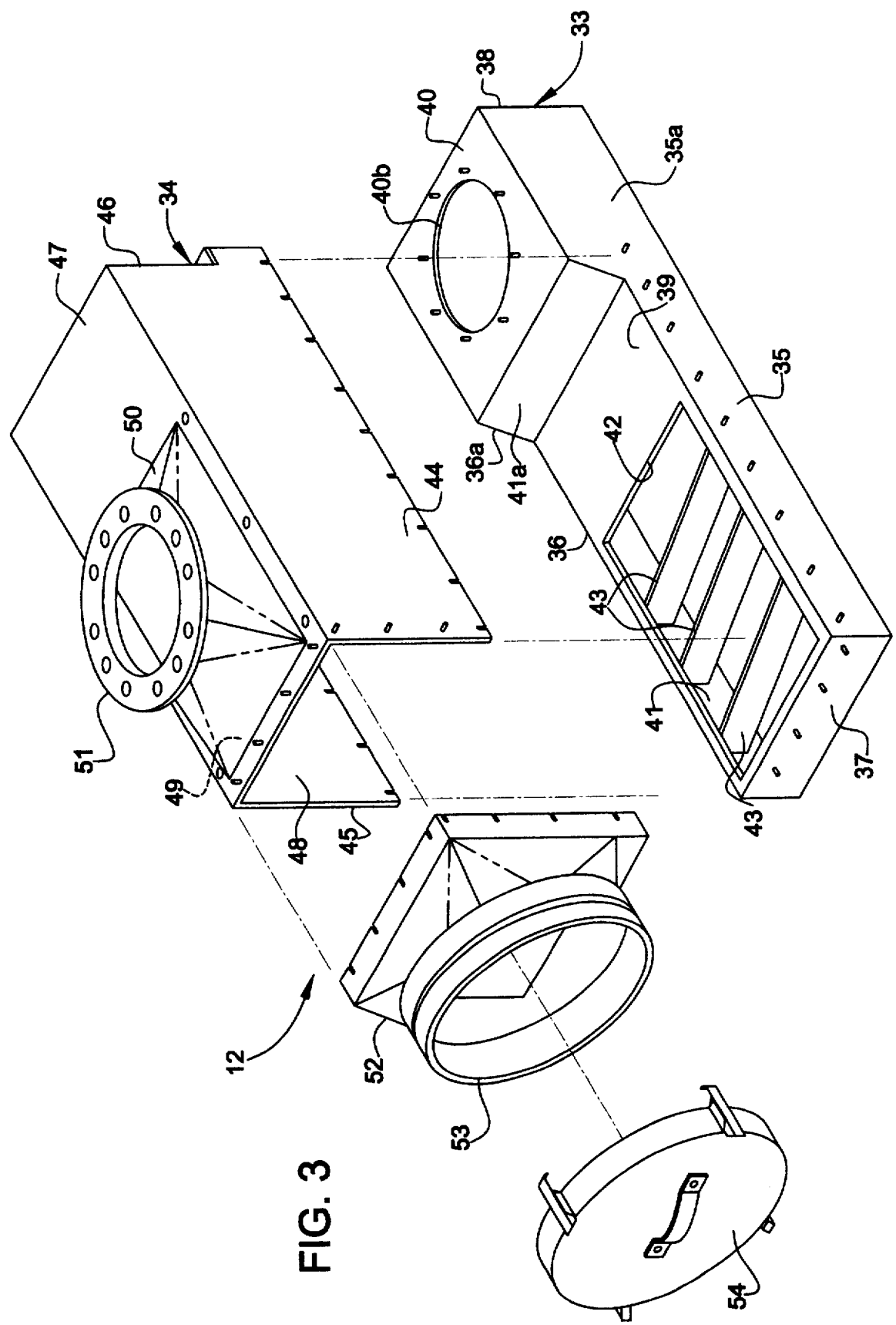
FIG. 3 is a perspective view of the housing components of a portion of the station shown in FIGS. 1 and 2.

Referring to FIG. 1 through 3 of the drawings, there is shown a filter bag dump station into which the comminuted material contents of bags may be dumped for further handling such as conveying, processing, storing and the like, which generally consists of a hopper assembly 10, a primary filter unit 11 and a secondary filter unit 12. The hopper assembly includes a support frame 13 supported on a set of leg members 14 and a hopper 15 having an upper rectangular inlet opening 16 and a lower outlet opening 17 adapted to be connected to a pneumatic conveying line or other conveying or storing equipment. Disposed across inlet opening 16 and supported on frame 13 is a removable grate 13b on which bags filled with comminuted material may be placed and ruptured to charge the contents thereof into hopper 15. Also supported on frame 13 is a pair of side walls 18 and 19 which are provided with a door 20 hinged on the upper end thereof which is adapted to close the hopper area when the station is not in use.

Primary filtering unit 11 also is supported on frame 13 and includes a front wall 21 forming a rear wall of the material charging area between side walls 18 and 19, and having a length greater than the spacing between end walls 18 and 19 so that the filter unit overhangs frame member 13 as shown in FIG. 1, a rear wall 22, an end wall 23, an access door 24 hinged on rear wall 22 and forming an end wall of the unit, an upper wall 25 and a lower wall 26 provided only on the overhanging portion of the unit to provide a lower inlet opening 27 of the unit communicating directly with the upper rear portion of the interior of hopper 15. Spaced inwardly of access door 24 and disposed parallel to end wall 23 is a tube sheet 28 having a plurality of inlet openings 29 communicating with an air plenum 30 defined by tube sheet 28, access door 24, portions of side walls 21 and 22, a portion of upper wall 25 and lower wall 26. Lower inlet opening 27 is defined by the lower edges of front and rear walls 21 and 22, end wall 23 and tube sheet 28.

Disposed in the chamber formed by portions of side walls 21 and 22, end wall 23, tube sheet 28 and a portion of upper wall 25 is a plurality of filter assemblies 31. Each of such assemblies consists of a tubularly configured cage member removably inserted through an inlet opening 29 and supported on the tube sheet with the interior thereof communicating with air plenum 30, and a bag of fabric or felt filter material disposed on the cage member, having the free end thereof clamped between an annular flange portion of the cage member and the tube sheet in the conventional manner. Each of the filter assemblies further extends almost the entire length of the chamber in which they are disposed so that particle laden air flow entering through lower inlet opening 27 will impinge upon the assemblies, filtering out at least a portion of such particles and causing the air to flow through the assemblies and inlet openings 29 into air plenum 30.

Detachably mounted in air plenum 30 is a plurality of nozzles each directed axially through an inlet opening 29 and the interior of a filter assembly for injecting pulses of high pressure air therein to provide a pneumatic shock wave within the bag of the filter assembly, causing it to flex and thus dislodge filtered material deposited on the filter medium of the assembly. Such nozzles are periodically supplied with compressed air through a supply line 32 provided with valves controlled by a solid state timer which progressively actuates such valves to introduce pulses of high pressure air through the nozzles. Typically, the cleaning cycle of the filter assemblies alternates continuously allowing those assemblies that are not in the cleaning mode to continue filtering.

As best shown in FIG. 3, secondary filtering unit 12 includes a lower section 33 mounted on upper wall 25 of primary filtering unit 11 and an upper section 34 which is mounted on lower section 33. Lower section 33 includes a pair of side walls 35 and 36 having end portions of increased height as at 35a and 36a, a pair of end walls 37 and 38, a lower top wall portion 39, an upper top wall portion 40 and, an inclined transition wall portion 41a. Filtering unit lower section 33 cooperates with upper wall 25 of primary filtering unit 11 to form a horizontally disposed, elongated air plenum 41.

Lower top wall portion 39 is provided with a rectangular outlet opening 42 at an end thereof communicating with air plenum 41. Disposed within air plenum 41, across outlet opening 42, is a plurality of vertically disposed, transversely extending baffle plates 43. As best shown in FIGS. 1 and 3, baffle plates 43 are disposed at small acute angles to planes disposed perpendicular to a longitudinal center line of air plenum 41, and are of progressively increasing vertical dimensions or depths in a direction toward an end of air plenum 41 so that an air stream flowing through air plenum 41 will be caused to have strata thereof progressively strike baffle plates 43 and be diverted upwardly through outlet opening 42 to distribute the air flow fairly uniformly along the length of outlet opening 42.

Filtering unit section 34 includes a pair of side walls 44 and 45 supported and secured to side walls 35 and 36 of lower section 33, an end wall 46 adapted to seat on upper wall portion 40 and an upper wall 47, which cooperate with section 33 to provide a chamber 48. Upper wall 47 is provided with a rectangular outlet opening 49 which is closed by an end cap transition member 50 provided with an annular flange 51 for connecting the apparatus to an air discharge line. The end opposite end wall 46 is closed by a transition member 52 mounted and secured to ends of side wall members 44 and 45 and upper wall 47. Transition member 52 is provided with an annular portion 53 having a detachable cover member 54.

Insertable through transition member 52 into chamber 48 is a rectangularly configured filter cartridge 55 which is adapted to seat on lower top wall portion 39, between rectangular outlet opening 42 and rectangular outlet 49. The cartridge is of a commercially available type having a rectangular configuration, a casing formed of metal or wood, and a glass fiber filter medium. The filter is of a type commonly referred to as a HEPA (High Efficiency Particulate Air) or Absolute Filter. The filter medium has a filter efficiency of at least 99.97% on particles of sub-micron size. It is fire resistant, resistant to temperatures up to 200° F. and to 100% to humidity.

Air flow through the apparatus is provided by a fan wheel 56 driven by a motor 57. As best shown in FIGS. 1 and 2, electric motor 57 is mounted on upper wall portion 40 with the drive shaft thereof projecting downwardly though an opening 40b into air plenum 41. Fan wheel 56 is mounted on the motor shaft and has an axially disposed inlet communicating through an opening in upper wall 25 with air plenum 30, and radially disposed outlets communicating with air plenum 41. Fan wheel 56 driven by motor 57 will draw air from air plenum 30 and discharge it under pressure through air plenum 41. Air drawn from air plenum 30 and through the opening in upper wall 25, is funneled into the axially disposed inlet of the fan wheel by means of a cone-shaped conduit 25a mounted on upper wall 25 and disposed axially relative to the fan wheel to provide a smooth air entry channel for the impeller.

In the operation of the apparatus as described, with the hopper door in the open position as shown in FIG. 2 and motor 57 operating, ambient air will be drawn from the space between side walls 18 and 19, through grate 13b, hopper 15, lower inlet opening 27, filter assemblies 31 and air plenum 30 and ejected under pressure through plenum 41, outlet opening 42, filter cartridge 55 and outlet opening 49. When a bag of comminuted material is broken open and placed on grate 13b, the bulk of such contents will gravity fall through the grate and into the hopper to be removed through outlet opening 17. Airborne particles of the material being dumped will be captured and entrained in the air flow created by fan wheel 56. Such particle laden air flow will be caused to pass downwardly into hopper 15 and then upwardly through lower opening 27 to impinge upon filter assemblies 31 causing a greater portion of the entrained particles to be filtered out and be either lodged on the filter media of assemblies 31 or gravity fall into the hopper. Air passing through filter assemblies 31 and laden with residual particles having a substantially sub-micron size will be caused to flow through the interiors of filter assemblies 31, air plenum 30, fan wheel 56, air plenum 41, outlet opening 42 and filter cartridge 55 to be discharged through outlet opening 49. As the air flow passes through air plenum 41, descending strata of such air flow will progressively impact on baffle plates 43 causing such strata to be diverted upwardly through filter cartridge 55 with such inlet air flow being fairly uniformly distributed along a surface of the filter medium of cartridge 55 overlying outlet opening 42. The impingement of such air flow with the filter medium of cartridge 55 will cause a significant percentage of residual airborne particles of a sub-micron size to be filtered out of the air stream discharged through opening 49.

In the preferred embodiment of the invention, the portion of front wall 21 disposed between end wall 23 and tube sheet 28, facing the work area, is formed as a removable panel with its upper edge spaced from upper wall 25 and the side edges spaced from end wall 23 and tube sheet 28 to provide a peripheral opening about the panel through which a portion of the ambient air in the work area may be drawn to enhance the air flow, particle entrainment and filtering action.

As the apparatus functions in such manner to filter out the airborne particles captured in the ambient air in the vicinity of the operator, the timer in control panel 58 will sequentially operate valves in compressed air line 32 to inject jets of compressed air into filter assemblies 31 to dislodge particles deposited thereon and cause such dislodged particles to gravity fall into the hopper to be discharged through outlet opening 17. Sensors further may be provided along the path of the air stream through the apparatus to detect a broken or leaking primary filtration element or a clogged secondary filtration element. One type of broken or leaking primary filtration element detector may consist of a probe inserted on a downstream side of the filtration element which functions to generate a measurable charge upon impingement of a predetermined amount of particulate in the airstream, indicating a broken or leaking bag condition. A conventional pressure differential gauge can be used to sense a clogged secondary filtration condition. Either of such devices or similar devices can be used to sense such conditions. Such conditions may be indicated on visual indicators on the control panel or by means of an audible alarm to alert the operator of such conditions.

Filter assemblies 31 may be removed from the primary filtering unit for replacement of the filter elements simply by opening access door 24, manipulating various clamp or other retainer devices securing annular flange portions of the assemblies on the tube sheet and then physically withdrawing the assemblies from the unit. The filter bag elements may then be removed and replaced and the assemblies may be reinserted in the unit and secured into position. Filter cartridge 55 may be removed and replaced simply by removing cover member 54 and sliding the cartridge out through the opening in the transition member. To prevent the escape of filtered material possibly dislodged from the cartridge when removed, a disposal bag may be clamped onto annular portion 53 so that the cartridge may be grasped with a portion of the bag and pulled into the bag thereby causing any dislodged material to be confined and received within the disposable bag. When a new or cleaned cartridge is reinserted in chamber 48, a bottom surface of the cartridge will be caused to overlie opening 42 to assure passage of the air stream up through the cartridge to provide the secondary filtering action for removing an increased percentage of particulates of sub-micron particle size.

The apparatus as described including the hopper assembly and the primary and secondary filtering assemblies preferably is fabricated from formed metal plates and sheets, usually stainless steel, welded together. Because there is no periodic, automatic cleaning of the secondary filter medium as in the case of the primary filter medium, and because of the small pore size of the secondary filter medium which is apt to blind over quickly, the primary filter medium must be as efficient as possible. Preferably, the primary filter medium consists of a polyester felt with a permeable membrane covering which provides an excellent primary filtration efficiency. Filter cartridge 55 can be of any commercially available type having a filtering efficiency of 99.97% or better on particles of sub-micron size. The capacity of the blower fan should be sufficient to provide an air stream velocity of 135 to 235 fpm. in the work area, depending on the capacity of the apparatus, to effectively capture and entrain airborne particles in the work area.

Although the primary filtering unit of the apparatus as described is effective in filtering out a substantial portion of the particles entrained in the air stream passing through the apparatus, including a portion of the particulate of a sub-micron particle size, the secondary filtering unit functions to remove a greater percentage of sub-micron particles passing through the primary filtering unit to provide compliance with more stringent dust control regulations of federal and state governments.

Figure 4:
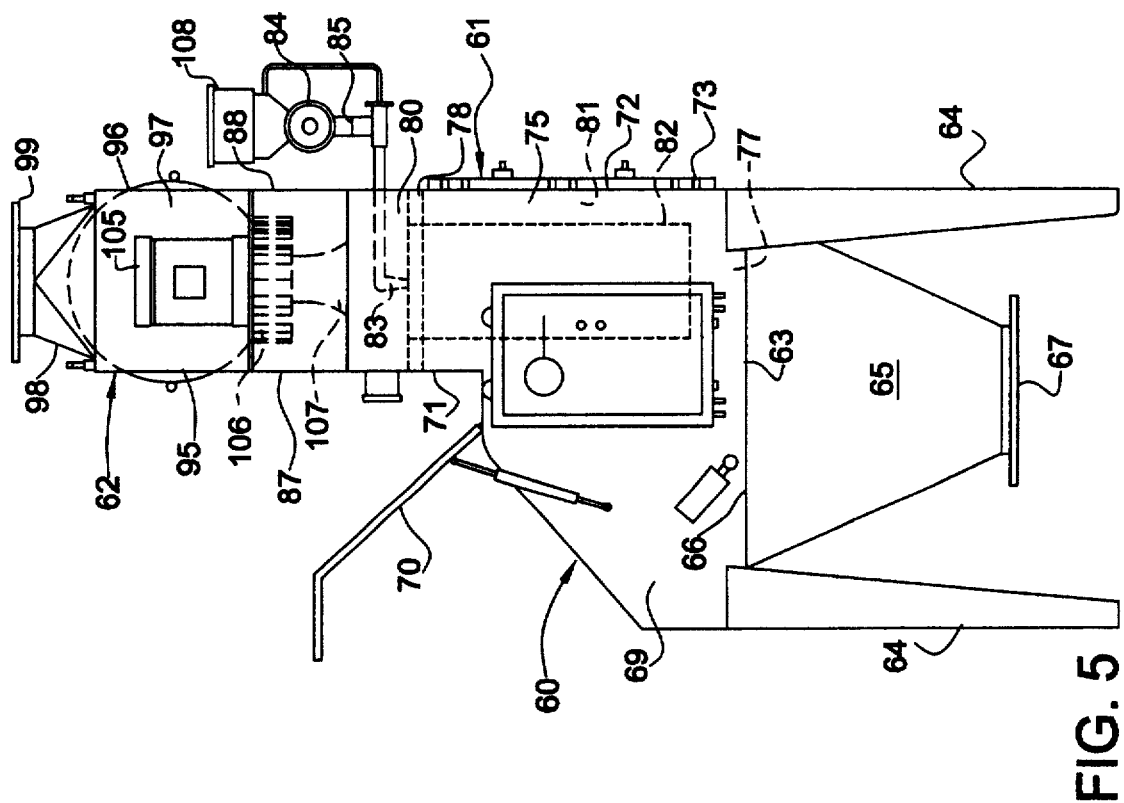
FIG. 4 is a front elevational view of another embodiment of the invention.
Figure 5:
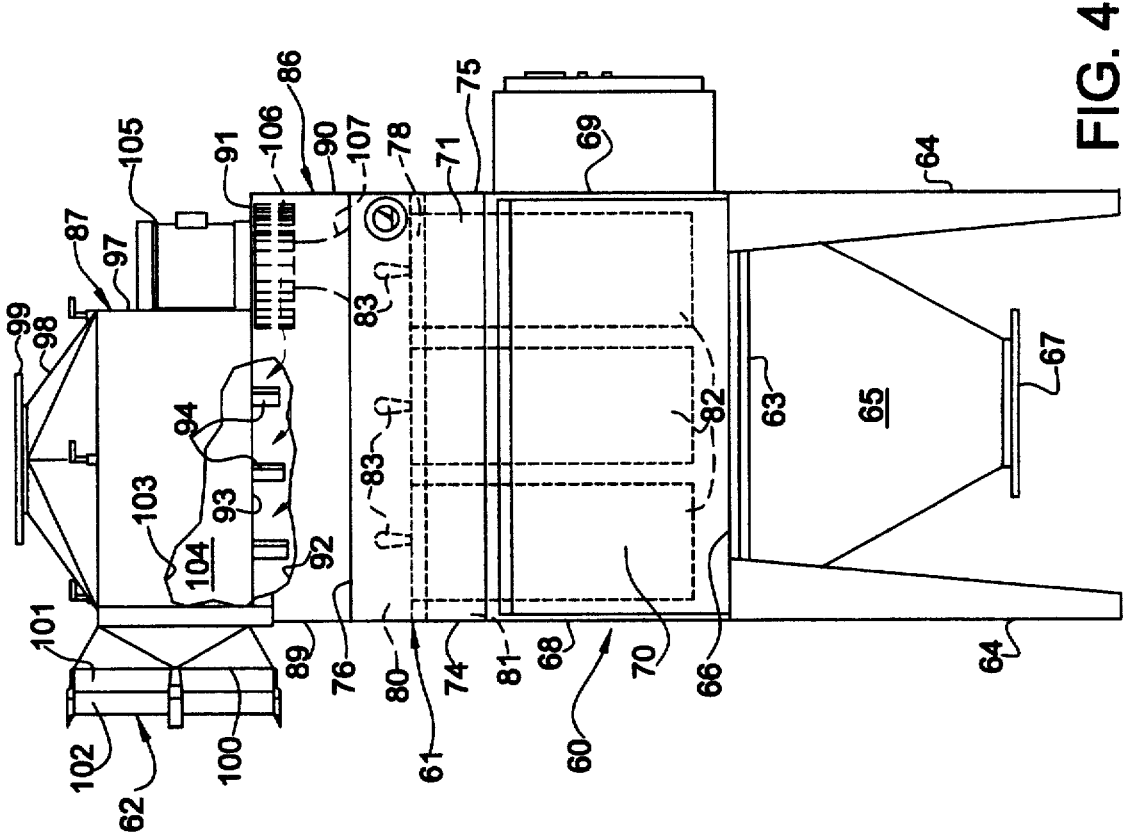
FIG. 5 is a side elevational view of the embodiment shown in FIG. 4.

The embodiment of the invention shown in FIGS. 4 and 5 is similar in construction and operation to the embodiment shown in FIGS. 1 through 3. Generally, it consists of a hopper assembly 60, a primary filter unit 61 and a secondary filter unit 62. The hopper assembly includes a support frame 63 supported on a set of leg members 64 and a hopper 65 having an upper rectangular inlet opening 66 and a lower outlet opening 67 adapted to be connected to a pneumatic conveying line or other conveying or storing equipment. Disposed across inlet opening 66 and supported on frame 63 is a removable grate on which bags filled with particulate material may be placed and ruptured to charge the contents thereof into hopper 65. Also mounted on frame 63 is a pair of side walls 68 and 69 which are provided with a door 70 hinged on the upper end thereof which is adapted to close the hopper area when the station is not in use.

Primary filtering unit 61 also is supported on frame 63 and includes a front wall 71 forming a rear wall of the material charging area between side walls 68 and 69, a rear wall 72 provided with a removable access panel 73, a pair of end walls 74 and 75 and an upper wall 76, providing a lower inlet opening 77 communicating directly with the upper rear portion of the interior of hopper 65. Spaced below and disposed parallel to upper wall 76 is a tube sheet 78 having a plurality of inlet openings communicating with an air plenum 80 defined by upper wall 76, front and rear walls 71 and 72, end walls 74 and 75 and tube sheet 78. Disposed in chamber 81 formed by portions of front and rear walls 71 and 72, end walls 74 and 75 and tube sheet 78 is a plurality of filter assemblies 82. Each of such assemblies consist of a tubularly-configured cage member removably attached to the tube sheet with the interior thereof communicating with air plenum 80, and a bag or sock of fabric or felt filter material disposed on the cage member, having the free end thereof clamped between an annular flange portion of the cage member and the tube sheet in the conventional manner. Alternatively, each of the filter assemblies may consist of a cartridge assembly having an annular mounting flange at the open end thereof for securing the cartridge assembly to the tube sheet with the interior thereof communicating with the air plenum through an aligned inlet opening in the tube sheet. Each of such filter assemblies extends vertically almost the entire depth of chamber 81 so that particulate entrained in air flow entering through lower inlet opening 77 will impinge upon such assemblies, filtering out a greater portion of such particles and causing air with residual particles of sub-micron size to flow through the assemblies and the inlet openings in the tube sheet into air plenum 80.

Mounted in air plenum 80 is a plurality of nozzles 83 each directed axially through an inlet opening in the tube sheet and the interior of a filter assembly for injecting pulses of high pressure air therein to provide a pneumatic shock wave within the filter medium of the filter assembly, causing it to flex and thus dislodge filtered material deposited thereon. Such nozzles are periodically supplied with compressed air through a manifold 84 and a supply line 85 provided with suitable valves controlled by a solid state timer which progressively actuates such valves to introduce pulses of high pressure air through the nozzles.

Secondary filtering unit 62 includes a lower section 86 mounted on upper wall 76 of primary filtering unit 61 and an upper section 87 which is mounted on lower section 86. Lower section 86 includes a pair of side walls 87 and 88, a pair of end walls 89 and 90 and an upper wall 91. Lower section 86 cooperates with upper wall 76 of primary filtering unit 61 to form a horizontally disposed, elongated air plenum 92.

Upper wall 91 of section 86 is provided with a rectangular outlet opening 93 comparable to outlet opening 42 of section 33 shown in FIG. 3, communicating with air plenum 92. Disposed within air plenum 92, across outlet opening 93, is a plurality of vertically disposed, transversely extending baffle plates 94 comparable to baffle plates 43 shown in FIG. 3. The baffle plates are disposed at small acute angles to planes disposed perpendicular to a longitudinal center line of air plenum 92, and are of progressively increasing vertical dimensions or depths in a direction toward an end of air plenum 92 so that an air stream flowing through air plenum 42 from the right side to the left side of the plenum relative to FIG. 4, will be caused to have strata thereof progressively strike baffle plates 94 and be diverted upwardly through outlet opening 92 to distribute the air flow fairly uniformly along the length of outlet opening 93.

Filtering unit section 87 is similar in construction to section 34 of the previously described embodiment, as shown in FIG. 3, and includes a pair of side walls 95 and 96 supported and secured to side walls 87 and 88 of section 86 and an end wall 97 seated on upper wall 91 of section 86. A transition member 98 provided with an annular flange 99 for connecting the apparatus to an air discharge line closes the upper portion of the section. The end of the section opposite end wall 97 is closed by a transition member 100 mounted and secured to ends of side wall members 95 and 96. Transition member 100 is provided with an annular portion 101 having a detachable cover member 102. Side walls 95 and 96, end wall 97 and the openings of section 87 closed by transition members 99 and 100 cooperate to form a filter chamber 103.

Insertable through transition member 100 into chamber 103 is a rectangularly configured filter cartridge 104, comparable to filter cartridge 55 shown in FIG. 1, which is adapted to seat on upper wall 91, between inlet opening 93 and transition member 98. As in the previously described embodiment, filter 104 is provided with a filter medium having a collection efficiency of not less than 99.97% on particles of sub-micron size.

Air flow through the apparatus is provided by an electric motor 105 mounted on upper wall 91 of section 86, adjacent section 87, and an impeller 106 disposed at one end of air plenum 92 and mounted on a shaft of motor 105 extending through an opening in upper wall 91. The impeller is provided with an axially disposed inlet opening which communicates with air plenum 80 through an opening in upper wall 76 by means of a flared or cone-shaped conduit 107.

The operation of the apparatus shown in FIGS. 4 and 5 is similar to the operation of the embodiment shown in FIGS. 1 through 3. With the hopper door in the open position as shown in FIG. 5 and motor 105 operating, ambient air will be drawn from the space between side walls 68 and 69 and through the grate across the hopper opening, hopper 65, lower inlet opening 77, filter assemblies 82 and air plenum 80, and be ejected under pressure through plenum 92, outlet opening 93, filter cartridge 104 and transition member 98. As bags of particulate material are broken open in the work area, the bulk of such material will gravity fall through the grate across the hopper and into the hopper to be removed through outlet opening 67. Airborne particles of the material being dumped into the hopper will be captured and entrained in the air flow created by impeller 106. Such particle laden air flow will be caused to pass downwardly into hopper 65 and then upwardly through lower opening 77 to impinge upon filter assemblies 82 causing a greater portion of the entrained particles to be filtered out and be either lodged on the filter medium of the assemblies or gravity fall into the hopper. Air passing through filter assemblies 82 and laden with particles having a substantially sub-micron size will be caused to flow through the interiors of filter assemblies 82, air plenum 80, air plenum 92, outlet opening 93 and filter cartridge 104 to be discharged through transition member 98. In a manner as previously described, as the air flow passes through air plenum 92, descending strata of such air flow will progressively impact on baffle plates 94 causing such strata to be diverted upwardly through the filter cartridge with such air flow being fairly uniformly distributed along a surface of the filter medium of cartridge 104 overlying outlet opening 93. The impingement of such air flow with the filter medium of cartridge 104 will cause a significant percentage of residual airborne particles of a sub-micron size to be filtered out of the air stream discharge through transition member 98.

During the operation of the apparatus as described, a timer in a control box 108 will sequentially operate valves in air lines 85 to inject jets of compressed air into the upper ends of filter assemblies 82 to dislodge particles deposited thereon and cause such dislodged particles to gravity fall into the hopper to be discharged along with other material therein through outlet opening 67. As in the previous embodiment, sensors may be provided along the path of the air stream through the apparatus to detect a broken or leaking primary filtration element or a clogged secondary filtration element.

Filter assemblies 82 may be removed from the primary filtering unit for replacement by removing access door 73, detaching the upper ends of the assemblies and withdrawing the assemblies through the opening in rear wall 72. Filter cartridge 104 may be removed and replaced simply by removing cover member 102 and sliding the cartridge out through the opening in transition member 100. As in the previously described embodiment, filtered material may be prevented from escaping during removal of the cartridge by means of a disposable bag clamped onto annular portion 101 so that the cartridge may be grasped with a portion of the disposable bag and pulled into the bag so that the dislodged material will be confined and received within the bag.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. An apparatus for industrial applications into which particulate material contents of rupturable bags may be charged for further handling comprising:

a hopper having an outlet into which said material may be charged, producing portions of settling and airborne particles of said material, and an outlet through which the settling portions of said material may be discharged;

a first filter unit having an inlet communicating with said hopper inlet;

a second filter unit having an inlet communicating with an outlet of said first filter unit;

means for producing an airflow from said hopper inlet and sequentially through said first and second filter units whereby said portion of airborne particles of said material is drawn by said airflow through said filter units for removing said airborne particles;

means include in said second filter unit defining an air plenum having an inlet communicating with said airflow producing means and an outlet communicating with a surface of a filter medium; and means disposed in said plenum for distributing an airflow traversing through said air plenum along a length of said filter medium surface comprising a set of baffle plates disposed in the path of said airflow whereby portions of said airflow are diverted along the length of said filter medium surface.

2. An apparatus according to claim 1 wherein said baffle plates depend from a plane disposed parallel to a plane of said filter medium surface and are provided with progressively greater depths proceeding downstream along the path of travel of said airflow.

3. An apparatus according to claim 2 wherein said outlet of said air plenum and said filter medium surface lie in said plane.

4. An apparatus according to claim 2 wherein said second filter unit comprises a removable cartridge.

5. An apparatus according to claim 4 wherein said cartridge is provided with a filter medium having a collection efficiency of at least 99.97% on particles of a sub-micron size.

6. An apparatus according to claim 1 wherein said air plenum is disposed horizontally, said air plenum outlet is disposed vertically and said baffle plates are disposed vertically across said air plenum outlet.

7. An apparatus for industrial applications into which particulate material contents of rupturable bags may be charged for further handling comprising:

a hopper having an inlet into which said material may be charged, producing portions of settling and airborne particles of said material, and an outlet through which the settling portions of said material may be discharged;

a first filter unit having an inlet communicating with said hopper inlet;

a second filter unit having an inlet communicating with an outlet of said first filter unit;

means for producing an airflow from said hopper inlet and sequentially through said first and second filter units whereby said portion of airborne particles of said material is drawn by said airflow through said filter units for removing said airborne particles;

means included in said first filter unit defining a first air plenum, having at least one inlet communicating with a first filter element and an outlet communicating with an inlet of said airflow producing means;

means includes in said second filter unit defining a second air plenum, having an inlet communicating with an outlet of said airflow producing means and an outlet communicating with a surface of a second filter element; and means disposed in said second air plenum for distributing an airflow transversing through said second air plenum along a length of a surface of said second filter element comprising a set of baffle plates disposed in the path of said airflow whereby portions of said airflow are diverted along the length of said filter medium surface.

8. An apparatus according to claim 7 wherein said baffle plates depend from a plane disposed parallel to a plane of said filter medium surface and are provided with progressively greater lengths proceeding downstream along the path of travel of said airflow.

9. An apparatus according to claim 8 wherein said outlet of said second air plenum and said filter medium surface lie in the same plane.

* * * * *